United States Patent
Kato et al.

(10) Patent No.: US 10,739,713 B2
(45) Date of Patent: Aug. 11, 2020

(54) PRINTING SYSTEM CONFIGURED TO FORCE A PREDETERMINED APPLICATION TO USE A DEFAULT PRINT PROFILE

(71) Applicants: KABUSHIKI KAISHA TOSHIBA, Tokyo (JP); TOSHIBA TEC KABUSHIKI KAISHA, Tokyo (JP)

(72) Inventors: Takeaki Kato, Mishima Shizuoka (JP); Shinya Nagano, Mishima Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/298,883

(22) Filed: Mar. 11, 2019

(65) Prior Publication Data

US 2019/0204770 A1    Jul. 4, 2019

Related U.S. Application Data

(63) Continuation of application No. 15/656,626, filed on Jul. 21, 2017, now abandoned.

(30) Foreign Application Priority Data

Sep. 5, 2016    (JP) .................................. 2016-172746

(51) Int. Cl.
*G03G 15/00*    (2006.01)
*G06F 3/12*    (2006.01)

(52) U.S. Cl.
CPC ........... *G03G 15/50* (2013.01); *G06F 3/1204* (2013.01); *G06F 3/1254* (2013.01);
(Continued)

(58) Field of Classification Search
CPC ....................................................... G03G 15/50
(Continued)

(56) References Cited

U.S. PATENT DOCUMENTS 8,773,675 B2 * 7/2014 Xiao ..................... G06F 3/1204
358/1.13
8,797,558 B2 * 8/2014 Oeters .................. G06F 3/1204
355/133

(Continued)

FOREIGN PATENT DOCUMENTS

EP    1308834 A2    5/2003
JP    H08-147118 A    6/1996
(Continued)

OTHER PUBLICATIONS

Extended European Search Report dated Feb. 2, 2018 filed in counterpart European Patent Application No. 17187508.1 (8 pages).
(Continued)

*Primary Examiner* — Quana Grainger
(74) *Attorney, Agent, or Firm* — Kim & Stewart LLP

(57) ABSTRACT

According to an embodiment, a printing system includes an information processing apparatus and an image forming apparatus connected to the information processing apparatus via a network. The information processing apparatus includes a memory device that stores information on an application program and information on a default print profile in association with each other. The information processing apparatus obtains, where printing is to be executed by the image forming apparatus, from the memory device, the information on the default print profile in association with the application program used to generate printable data.

10 Claims, 4 Drawing Sheets

(52) U.S. Cl.
CPC .......... *G06F 3/1257* (2013.01); *G06F 3/1285* (2013.01); *G06F 3/1239* (2013.01)

(58) Field of Classification Search
USPC .......................................................... 399/83
See application file for complete search history.

(56) References Cited

U.S. PATENT DOCUMENTS

| | | |
|---|---|---|
| 9,544,470 B2 | 1/2017 | Herold et al. |
| 2003/0081019 A1 | 5/2003 | Frolik et al. |
| 2004/0105115 A1 | 6/2004 | Edwards et al. |
| 2005/0031392 A1 | 2/2005 | Yamamoto et al. |
| 2006/0092463 A1 | 5/2006 | Ahn |
| 2015/0062674 A1 | 3/2015 | Horita |

FOREIGN PATENT DOCUMENTS

| | | |
|---|---|---|
| JP | H10-301723 A | 11/1998 |
| JP | 2011-113165 A | 6/2011 |

OTHER PUBLICATIONS

Computer translation of applicant cited document JP08-147118A to Kato published on Jul. 6, 1996.

\* cited by examiner

PRINTING SYSTEM CONFIGURED TO FORCE A PREDETERMINED APPLICATION TO USE A DEFAULT PRINT PROFILE

CROSS-REFERENCE TO RELATED APPLICATION

This application is a continuation of U.S. patent application Ser. No. 15/656,626, filed on Jul. 21, 2017, which application is based upon and claims the benefit of priority from the prior Japanese Patent Application No. 2016-172746, filed on Sep. 5, 2016, the entire contents of which are incorporated herein by reference.

FIELD

An embodiment to be described here generally relates to a printing system that automatically applies a print profile used for printing depending on an application program, and a printing method.

BACKGROUND

Typically, an image forming apparatus is capable of printing printable data generated by an application program executable by an information processing apparatus (PC) such as a personal computer connected to the image forming apparatus. In this case, the PC starts a printer driver, and thereby displays a print instruction window. The PC accepts a print profile set by a user by using the print instruction window. Examples of print profiles include "Nin1" print, "black-and-white" print, "duplex" print, and the like. In the "Nin1" print, printable data of a plurality of pages (N pages) is assigned to one sheet and printed. In the "black-and-white" print, a black-and-white image is printed. In the "duplex" print, images are printed on the both sides of a sheet. The PC outputs a print job to the image forming apparatus, the print job including information on the accepted print profile.

Meanwhile, there is known a printing system that charges a user per printing volume of an image forming apparatus. The printing volume is determined on the basis of, for example, the number of printed sheets (number of printing) and print color. In other words, the printing volume depends on the print profile. Further, in general, an arbitrary print profile (for example, 2in1, black-and-white, duplex, etc.) is set by a user as the print profile. For example, where a user wants to print data of 100 pages and where printing is executed on the basis of the print profile "black-and-white, duplex, 2in1", the printing system charges the user of printing on the basis of the printing volume, in which the number of printing is 25 and the print color is black-and-white. Meanwhile, depending on a user, printing may be executed on the basis of another print profile "full-color, simplex, 1in1". In the case of this print profile, the printing system charges the user on the basis of the printing volume, in which the number of printing is 100 and the print color is full-color, whose printing cost is 4 times or more of the printing cost of the print profile "black-and-white, duplex, 2in1".

In other words, even if a manager recommends a user to execute printing on the basis of a low-cost print profile, it depends on a user to set the low-cost print profile. However, when a user is in a hurry and in other cases, the user forgets to set the low-cost print profile. As a result, printing may be executed on the basis of a high-cost print profile. It is difficult for users to always use low-cost print profiles, which is a problem.

DETAILED DESCRIPTION

According to an embodiment, a printing system includes an information processing apparatus and an image forming apparatus connected to the information processing apparatus via a network. The information processing apparatus includes a first communication interface, a memory device, and a first processor. The memory device stores information on an application program and information on a default print profile in association with each other. The first processor, where data generated by using an application program is to be printed by the image forming apparatus, obtains, from the memory device, the information on the default print profile in association with the information on the application program used to generate the data. Further, the first processor sends a print job to the image forming apparatus via the first communication interface, the print job including the obtained information on the default print profile and the data. The image forming apparatus includes a second communication interface, a printer device, and a second processor. The printer device forms an image on a sheet. The second processor receives the print job from the information processing apparatus via the second communication interface, and then controls the printer device to form an image based on the data on a sheet on the basis of the default print profile.

Figure 1:
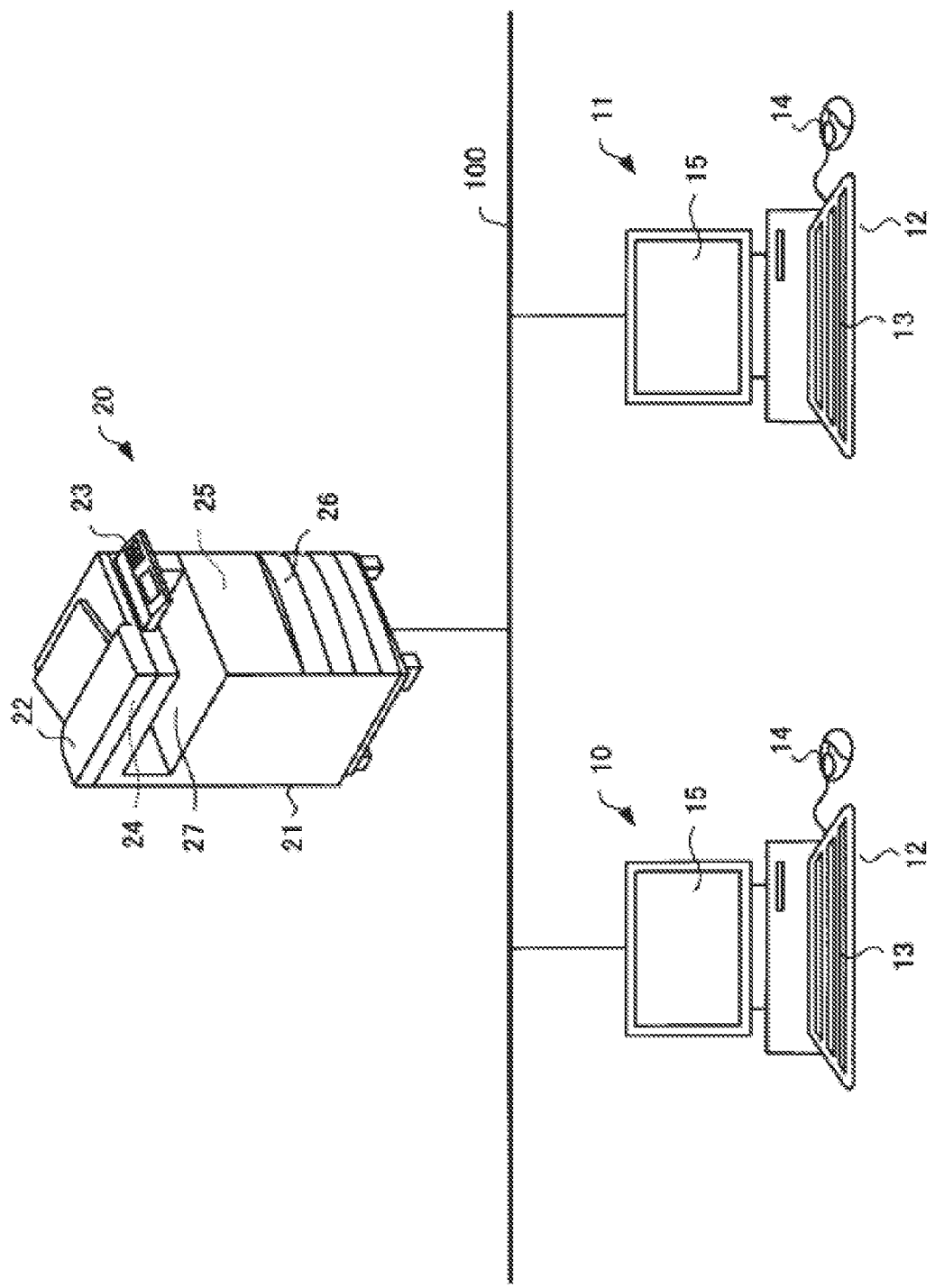
FIG. 1 is a diagram showing a printing system of an embodiment.

Hereinafter, a printing system of an embodiment will be described with reference to the drawings. In the drawings, the same reference symbols indicate the same or similar hardware/software. FIG. 1 is a diagram showing a printing system of the embodiment including an information processing apparatus and an image forming apparatus. As shown in FIG. 1, the plurality of information processing apparatuses 10 and 11 are connected to the image forming apparatus 20 via the network 100 such as a LAN (Local Area Network). The plurality of information processing apparatuses 10 and 11 and the image forming apparatus 20 are capable of communicating with each other via the network 100. Note that the printing system of FIG. 1 includes the two information processing apparatuses 10 and 11. Alternatively, the printing system may include three or more information processing apparatuses.

Each of the plurality of information processing apparatuses 10 and 11 is a personal computer (PC), for example. Hereinafter, the information processing apparatuses 10 and 11 will be referred to as the PCs 10 and 11. The PC 10 is a PC for a manager, for example. The other PC 11 is a PC for a managed person (user), for example.

The configuration of the PC 10 is similar to that of the PC 11. The PC 10 or 11 includes the input devices 12 and the display 15 that displays various images (described later). The input devices 12 include the keyboard 13 and the mouse 14. Meanwhile, the image forming apparatus 20 is a multi-function printer, i.e., an MFP (Multifunction Peripheral), a printer, or the like. The image forming apparatus 20 of FIG. 1 is an MFP, for example.

The image forming apparatus 20 includes the automatic document feeder (ADF) 22 and the operation panel 23. Further, the image forming apparatus 20 includes a platen (not shown) provided above the main body 21 and other components. The ADF 22 is openable and closeable over the platen. Further, the operation panel 23 is provided above the main body 21. The operation panel 23 includes, for example, the various operation keys 232 and the touchpanel-type display 231 (see FIG. 2).

Further, the image forming apparatus 20 includes the scanner 24. The scanner 24 is provided below the ADF 22 and in the main body 21. The scanner 24 scans and captures a document fed by the ADF 22 or a document put on the platen, and generates data to be printed.

Further, the image forming apparatus 20 includes the plurality of cassettes 26, the printer device 25, and the sheet-discharge device 27. The cassettes 26 are provided in and at the bottom of the main body 21. The cassettes 26 accommodate sheets having various sizes. The printer device 25 is provided in and at the middle of the main body 21. The printer device 25 includes, for example, a known photosensitive drum, a known exposure mechanism, and the like. The printer device 25 is a device that forms images by using the electrophotographic method. The printer device 25 processes data generated by the scanner 24 and printable data generated by the PCs 10 and 11, and forms (prints) images corresponding to the image data and the printable data on sheets. The sheet-discharge device 27 is provided below the scanner 24. The sheet-discharge device 27 discharges sheets on which images are printed by the printer device 25.

Figure 2:
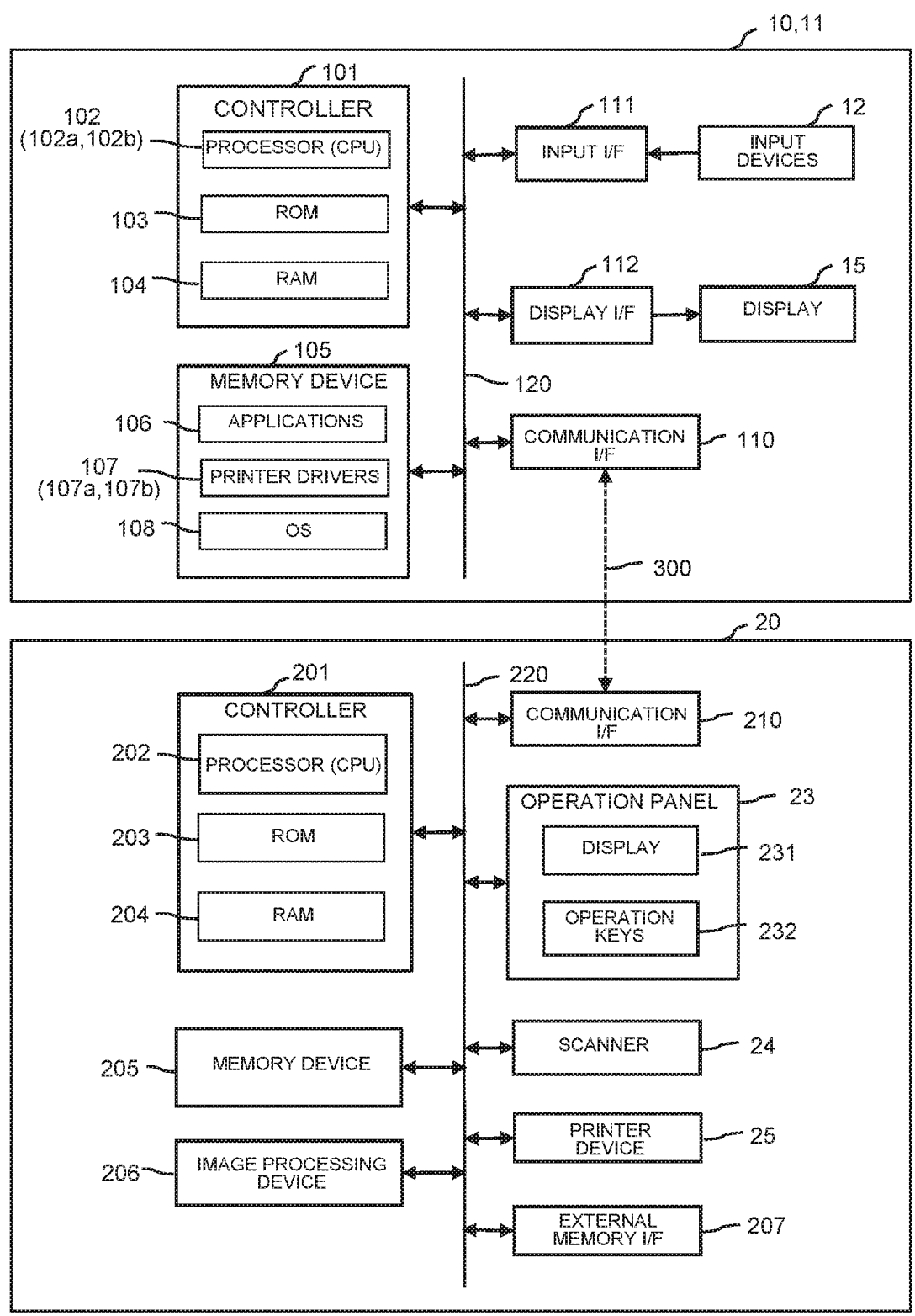
FIG. 2 is a block diagram showing an information processing apparatus and an image forming apparatus of the printing system of the embodiment.

FIG. 2 is a block diagram showing the image forming apparatus 20 and the PC 10 for a manager out of the plurality of PCs of the printing system. The PC 10 functions as a print setting apparatus for the image forming apparatus 20, and includes software and hardware for communicating with the image forming apparatus 20. The configuration of the other PC 11 for a user is similar to that of the PC 10. The PC 11 for a user is capable of communicating with the image forming apparatus 20. Note that FIG. 2 does not separately show the PC 11.

As shown in FIG. 2, the PC 10 functions as a print setting apparatus for setting default print profiles (described later) of the PC 11, and functions as an apparatus for instructing the image forming apparatus 20 to execute printing. The PC 10 includes the controller 101, the memory device 105, the communication interface (communication I/F) 110, the input interface (input I/F) 111, the input devices 12, the display interface (display I/F) 112, and the display 15. Further, the PC 11 functions as an apparatus for instructing the image forming apparatus 20 to execute printing. The devices that the PC 11 includes are similar to those the PC 10 includes.

The controller 101 controls the respective units of the PC 10 or 11. The controller 101 includes, for example, the processor 102 including a CPU (Central Processing Unit), the ROM (Read Only Memory) 103, and the RAM (Random Access memory) 104. The processor 102 executes various programs stored in the ROM 103 to thereby control operations of the PC 10 or 11. The RAM 104 provides the processor 102 with temporary work areas. The respective devices of the PC 10 or 11 are connected with each other via the bus 120. Note that, in the following description, the processor of the PC 10 will be referred to as the processor 102a and the processor of the PC 11 will be referred to as the processor 102b in order to distinguish between the processor 102 of the PC 10 and the processor 102 of the PC 11. Further, similarly, in the following description, the memory device of the PC 10 will be referred to as the memory device 105a and the memory device of the PC 11 will be referred to as the memory device 105b in order to distinguish between the memory device 105 of the PC 10 and the memory device 105 of the PC 11.

The memory device 105a stores the plurality of application programs 106 for generating printable data. Further, the memory device 105a stores the printer driver 107a for instructing the image forming apparatus 20 to print printable data and for setting default print profiles (described later). Further, the memory device 105a stores the printer driver 107b to be transmitted to the PC 11. Further, the memory device 105b stores the application programs 106 for generating printable data. Further, the memory device 105b stores the printer driver 107b transmitted from the PC 10. Further, the memory device 105 stores the OS (Operating System) 108, which is a program for managing the PC 10 or 11. The memory device 105 is, for example, a Hard Disk Drive (HDD), another magnetic memory device, an optical memory device, or a semiconductor memory device such as a flash memory, or includes some memory devices out of them in combination as necessary.

The application programs 106 operate as software managed by the OS 108. The application programs 106 include general software such as word processor software and, in addition, Web application. The printer driver 107a is a program that configures the main part of the PC 10 functioning as the print setting apparatus for setting default print profiles. Further, the printer driver 107a of the PC 10 is a driver program for controlling the image forming apparatus 20 on the basis of print instructions of the application programs 106. Further, the printer driver 107b of the PC 11 is a driver program for controlling the image forming apparatus 20 on the basis of print instructions of the application programs 106. The printer driver 107 operates as software managed by the OS 108.

The communication I/F 110 is an interface for connecting to external devices. The PCs 10 and 11 communicate with each other via the communication I/Fs 110. Further, the communication I/F 110 communicates, for example, with the image forming apparatus 20. Further, the communication I/F 110 may include a USB connection unit, to which a USB (Universal Serial Bus) standard connection terminal is to be connected. The controller 101 communicates with the image forming apparatus 20 and other external information processing apparatuses via the communication I/F 110.

The input I/F 111 is connected to the input devices 12. The input devices 12 include the keyboard 13 and the mouse 14 of FIG. 1. The display I/F 112 is connected to the display 15. The display I/F 112 receives data to be displayed on the display 15 or instruction from other devices connected to the bus 120, and outputs display data to the display 15. The display 15 is, for example, a display attached to the PC 10 or 11.

Meanwhile, the image forming apparatus 20 includes the controller 201, the memory device 205, the image processing device 206, the external memory interface (I/F) 207, and the communication interface (communication I/F) 210. Further, as described above, the image forming apparatus 20 includes the operation panel 23, the scanner 24 that scans and captures documents, and the printer device 25 that forms images. The devices of the image forming apparatus 20 are connected with each other via the bus 220. The controller 201 includes, for example, the processor 202 including a CPU, the ROM 203, and the RAM 204. The processor 202 controls the overall operations of the image forming apparatus 20. The ROM 203 stores control programs of the processor 202. The RAM 204 provides the processor 202 with temporary work areas.

The memory device 205 stores application programs and the OS. The application programs stored in the memory device 205 include programs for realizing functions of the image forming apparatus such as, copy function, print function, image scanner function, facsimile function, and network file function.

Further, the memory device 205 temporarily stores image data of a document generated by the scanner 24, or data to be printed such as printable data obtained from the PCs 10 and 11 via the communication I/F 210. The memory device 205 is, for example, a Hard Disk Drive (HDD) or a semiconductor memory device such as a flash memory.

The controller 201 executes control programs and other programs stored in the ROM 203 or the memory device 205 to thereby control the operation panel 23, the scanner 24, the printer device 25, the image processing device 206, the external memory I/F 207, and the like.

As described above, the scanner 24 scans a document fed by the ADF 22 (see FIG. 1) or a document put on the platen, and generates image data. The printer device 25 forms image data of documents generated by the scanner 24 or images corresponding to printable data sent from the PCs 10 and 11 on sheets. The printer device 25 forms images corresponding to the image data or the printable data on sheets by using toners of four colors, i.e., cyan, magenta, yellow, and black, for example.

The image processing device 206 variously processes (e.g., tone correction and edge detection processing, etc.) images of data to be printed (the image data and the printable data) obtained via the communication I/F 210 and obtained by the scanner 24. The image processing device 206 includes, for example, an ASIC (Application Specific Integrated Circuit). The external memory I/F 207 communicates with a USB device and other external memories.

The communication I/F 210 is an interface for connecting to external information processing apparatuses (for example, the PCs 10 and 11). The controller 201 communicates with the PCs 10 and 11, a USB device, and other external devices via the communication I/F 210. In the present embodiment, the controller 201 of the image forming apparatus 20 communicates with the controller 101 of the PC 10 or 11 via the bidirectional interface 300 between the communication I/F 210 and the communication I/F 110.

The operation panel 23 includes the touchpanel-type display 231 and the various operation keys 232. The operation keys 232 include, for example, a numeric keypad, a reset key, a stop key, a start key, and the like. The controller 201 displays a predetermined setting window on the display 231. When a user wishes to copy a document, for example, the setting window displayed on the display 231 detects touch operations of a user, and thereby inputs instructions from the user about the sheet size, the number of copies, the print density, and the like. Further, where a postprocessing apparatus (finisher or the like) is connected to the downstream of the image forming apparatus 20, the display 231 displays the setting window used to input instructions of a user for finishing (staple, hole-punching) or the like.

Next, the print process, in which the PC 10 or 11 sends printable data to the image forming apparatus 20 and the image forming apparatus 20 prints the printable data, will be described. The printable data is data generated by using the application programs 106. The printable data includes document data, image data, and the like.

Specifically, the printable data includes, for example, document data generated by using Word (Microsoft Corporation, registered trademark), which is software of Microsoft Corporation (United States), spreadsheet data generated by using Excel (Microsoft Corporation, registered trademark), presentation data generated by using PowerPoint (Microsoft Corporation, registered trademark), or the like, and includes data such as document data, image data, and graphic data. Further, the printable data may be PDF (Portable Document Format). PDF is a file format developed by Adobe Systems Incorporated (United States).

The processor 102 generates information on print profiles, generates/converts printable data, selects an image forming apparatus, and the like. As described above, the application programs 106 and the printer driver 107a of the PC 10 are programs stored in the memory device 105a. Further, the application programs 106 and the printer driver 107b of the PC are programs stored in the memory device 105b. The processor 102 loads those programs in the RAM 104 and executes those programs.

The processor 102a of the PC 10 executes the printer driver 107a to thereby process printable data or the processor 102b of the PC 11 executes the printer driver 107b to thereby process printable data, where the PC 10 or 11 sends a print job to the image forming apparatus 20, the print job including the printable data generated by using the application programs 106, the printable data being to be printed by the image forming apparatus 20. In other words, the processor 102a or 102b executes the printer driver 107a or 107b to thereby convert the printable data into the PDL (Print Description Language) format or the like that the image forming apparatus 20 can recognize, and sends the printable data after conversion to the image forming apparatus 20 via the communication I/F 110. Further, the processor 102a or 102b processes an image of the printable data, which is generated by using the application program 106, on the basis of print profiles such as zoom-in/zoom-out, Nin1 (a plurality of pages are output in one page), simplex print, and duplex print. In general, the PC 10 or 11 starts the printer driver 107a or 107b and thereby displays a print instruction window on the display 15. The print profiles are input by a user (or a manager as a user) by using the print instruction window and the input devices 12. The processor 102a or 102b executes the printer driver 107a or 107b, and thereby displays the print instruction window on the display 15. The processor 102a or 102b accepts print profiles input by a user by using the print instruction window displayed on the display 15 and the input devices 12. Note that, where a finisher is connected to the downstream of the image forming apparatus 20, on/off setting of optional functions for sheets such as staple and hole-punching is input by a user by using the print instruction window.

The printer driver 107a or 107b includes a plurality of packages. Each package includes, for example, an executable file, a profile, an installation file, and the like.

The processor 102a or 102b executes the printer driver 107a or 107b and thereby processes data generated by using the application program 106, where the data generated on the basis of the application program 106, i.e., printable data, is sent to the image forming apparatus 20 to be printed. In other words, the processor 102a or 102b executes the printer driver 107*a* or 107*b*, and thereby converts the data into a control command that the image forming apparatus 20 can recognize. The control command after conversion, i.e., data to be printed, is output to the image forming apparatus 20 (the communication I/F 210) via the communication I/F 110.

Further, where an image of data generated on the basis of the application program 106 is to be processed on the print profile such as "zoom-in/zoom-out", "Nin1", and "duplex print", the processor 102*a* or 102*b* accepts the print profile input by a user by using the print instruction window based on the printer driver 107*a* or 107*b* and the input devices 12.

In the above-mentioned way, the image forming apparatus 20 is capable of printing printable data, which is generated on the basis of an application program executable by the PC 10 or 11. In other words, the PC 10 or 11 is capable of instructing the image forming apparatus 20 to print printable data generated on the basis of an application program.

By the way, the printer driver 107*b* is started and thereby the print instruction window is displayed. The print profiles can be set by a user by using the print instruction window. Examples of the print profiles include the Nin1 (a plurality of pages are allocated to one sheet and printed) print profile, the print profile of black-and-white print or full-color print, and/or the like. The PC 11 outputs the print job, to which the print profile is applied, to the image forming apparatus 20. In other words, the PC 11 outputs a print job to the image forming apparatus 20, the print job including information on the print profile, and thereby instructs the image forming apparatus 20 to execute printing. However, even if a manager recommends a user to execute printing on the basis of a low-cost print profile, it depends on a user to set the low-cost print profile by using the print setting window. So the image forming apparatus 20 may execute printing on the basis of a high-cost print profile selected by a user. It is difficult for users to always use low-cost print profiles, which is a problem.

In view of the above-mentioned circumstances, according to the printing system of this embodiment, where printable data generated on the basis of a desired application program is to be printed by the image forming apparatus 20, a default print profile (low-cost print profile, etc.) preset for each application program can be automatically applied to a print job.

Hereinafter, the default print profile setting process and the print process of the printing system of this embodiment will be described. The default print profile setting process is executed by the PC 10 (print setting apparatus). In the print process, the PC 10 or 11 instructs the image forming apparatus 20 to execute printing on the basis of the default print profile. Where the PC 10 executes the setting process, the processor 102*a* of the PC 10 executes the function of a print setting registering means on the basis of the printer driver 107*a*, i.e., the main program of the print setting apparatus. Further, where the PC 10 or 11 executes the print process, the processor 102*a* or 102*b* of the PC 10 or 11 executes the functions of an information obtaining means and a print setting applying means on the basis of the printer driver 107*a* or 107*b*.

Where the processor 102*a* functions as the print setting registering means, the processor 102*a* stores application information and information on a default print profile in a predetermined file out of files of the printer driver 107*a*, for example. Hereinafter, the predetermined file will be referred to as a setting information file. As described above, the printer driver 107*a* including the setting information file is stored in the memory device 105. Therefore, in other words, the application information on the setting information file and the information on the default print profile are stored in the memory device 105. Further, the application information is information corresponding to an application program. The application information and the information on the default print profile are stored in the setting information file of the printer driver 107*a* stored in the memory device 105 in association with each other. In other words, the information on the default print profile is assigned to the application program corresponding to the application information in association with each other. Note that information on a predetermined print profile, which is preset independent of an application program, is also stored in the setting information file. Further, where the processor 102*a* or 102*b* functions as an information obtaining means, the processor 102*a* or 102*b* checks application information corresponding to an application program used to generate printable data against application information stored in the setting information file. The processor 102*a* or 102*b* determines whether the application information matches the application information stored in the setting information file or not as a result of the check. Where the application information matches the application information stored in the setting information file, the processor 102*a* obtains, from the setting information file, the information on the default print profile in association with the matching application information. Where the processor 102*a* or 102*b* functions as a print setting applying means, the processor 102*a* or 102*b* instructs the image forming apparatus 20 to execute printing on the basis of a print job, to which the default print profile of the obtained information is applied.

Figure 3:
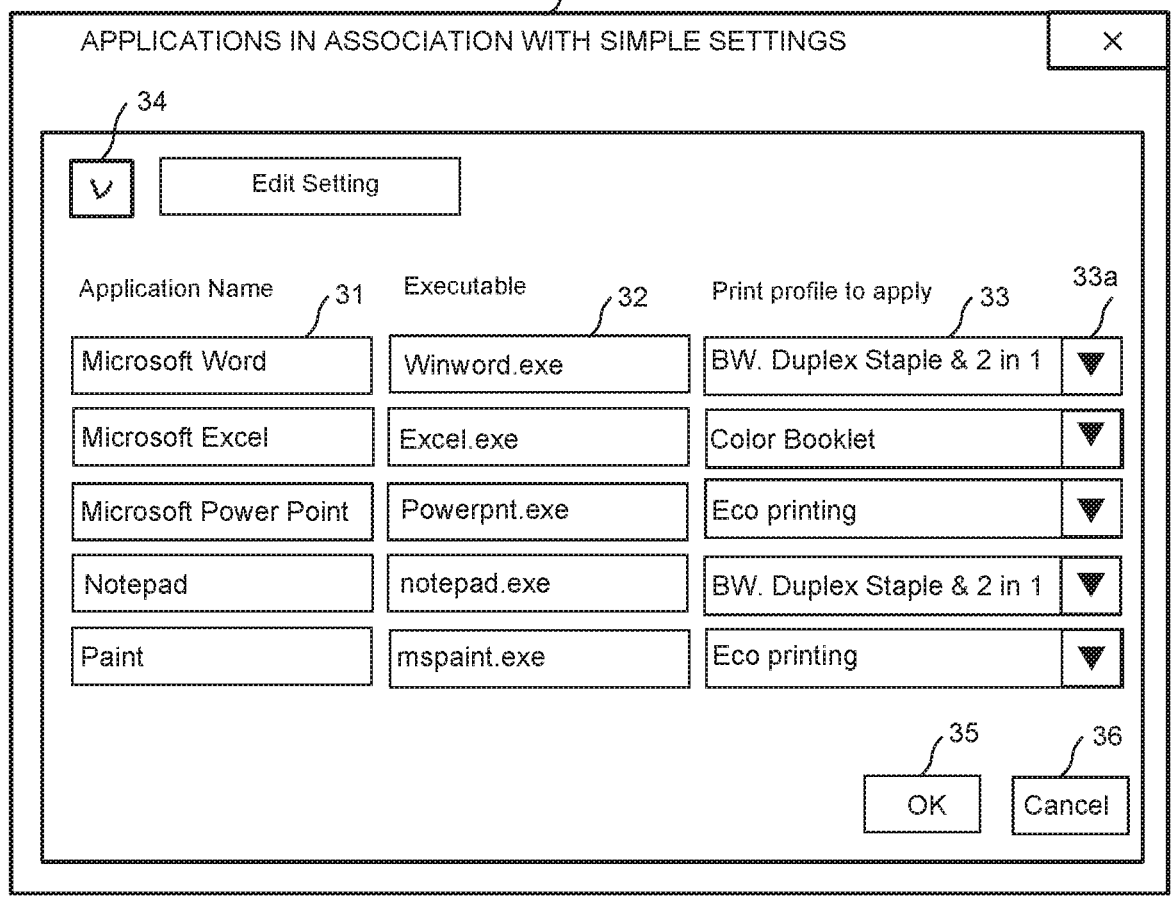
FIG. 3 is a diagram for illustrating an example of a default profile setting window based on a printer driver of the information processing apparatus of the printing system of the embodiment.

FIG. 3 is a diagram for illustrating an example of the default profile setting window 30, which is displayed on the display 15 of the PC 10 on the basis of the property of the printer driver 107*a* where the PC 10 executes the setting process. In FIG. 3, the default profile setting window 30 is a window operated by a manager when the manager sets application information and a default print profile for each application information. The default profile setting window 30 includes, as application information input areas, the first input area 31 for inputting application names and the second input area 32 for inputting application executable file names. Further, the default profile setting window 30 includes the third input area 33 for inputting print profiles. Further, the default profile setting window 30 includes the setting area 34 for setting that to edit a print profile is allowed/not allowed. Further, the default profile setting window 30 includes the OK button 35 and the cancel button 36.

<Process 1>

Firstly, a manager logs in to the PC 10. The processor 102*a* recognizes that a manager logs in to the PC 10, and then displays a window-for-manager on the display 15, for example. Next, the manager instructs to set print profiles by using the window-for-manager. The processor 102*a* accepts an instruction to set print profiles from the manager, and then executes the printer driver 107*a* to thereby display the default profile setting window 30 of FIG. 3 on the display 15. The manager sets default print profiles corresponding to application information (application names, application executable file names) on application programs by using the default profile setting window 30 displayed on the basis of the printer driver 107*a*.

In other words, for example, the manager inputs, in the first input area 31 of the default profile setting window 30 of FIG. 3, "Microsoft Word", "Microsoft Excel", and "Microsoft Power Point", i.e., software of Microsoft Corporation (United States), and other names as application names, for example. Further, the manager inputs, in the second input area 32, "Winword.exe", "Excel.exe", "Powerpnt.exe", and the like as application executable file names corresponding to the application names input in the first input area 31. An executable file has an extension such as ".exe", for example.

Next, the manager inputs default print profiles in the third input area 33 of the default profile setting window 30 of FIG. 3. Specifically, the manager operates the operation button 33a of the third input area 33. The processor 102a recognizes that the operation button 33a of the third input area 33 is operated, and then displays a pulldown menu. The manager selects a default print profile from the pulldown menu. For example, in the default profile setting window 30 of FIG. 3, a print profile "black-and-white, duplex, staple, 2in1" is selected as the default print profile corresponding to the application information, i.e., the application name "Microsoft Word" and the application executable file name "Winword.exe".

Note that the pulldown menu of the third input area 33 includes a plurality of print profiles. The manager may select another print profile such as "black-and-white, duplex, 4in1" and "full-color, simplex, 1in1", for example, instead of the print profile "black-and-white, duplex, staple, 2in1".

Further, the print profile of the pulldown menu is a print profile including a plurality of profiles in combination, for example. Therefore it is not necessary for the manager to set respective profiles individually, but the manager may easily set a print profile including a plurality of profiles in combination. Further, the manager may optionally set no-selection. Further, the manager may select a default print profile for each application information, i.e., another application name and another executable file name, in the similar way.

After the manager inputs default print profiles as described above, the manager clicks the OK button 35 of the default profile setting window 30. Then the input default print profile is set corresponding to each application information. In other words, the processor 102a recognizes that the OK button 35 is clicked, and then accepts application information and the default print profile of each application information, which are input by the manager by using the default profile setting window 30. The processor 102a stores, in the setting information file of the printer driver 107a, the application information and the information on the default print profile of each application information in association with each other. Further, after the manager inputs the default print profiles as described above, the manager may click the cancel button 36 of the default profile setting window 30 to correct the input default print profiles. In other words, the processor 102a recognizes that the cancel button 36 is clicked, then, for example, clears the default print profiles input by using the default profile setting window 30, and allows the manager to input new default print profiles.

<Process 2>

After the processor 102a stores the application information and the information on the default print profile in the setting information file of the printer driver 107a as described above, the processor 102a displays the window-for-manager on the display 15 again, for example. The manager inputs an export instruction by using the window-for-manager to export the information on the default print profile set in the above-mentioned Process 1 from the printer driver 107a. The processor 102a accepts the export instruction input by the manager, then exports the setting information file from the printer driver 107a, and exchanges the setting information file in the configuration package of the printer driver 107b with the exported setting information file. As a result of the exchange, the setting information file of the printer driver 107b is overwritten and updated.

<Process 3>

After the processor 102a updates the printer driver 107b as described above, the processor 102a displays the window-for-manager on the display 15 again, for example. The manager inputs a transmitting instruction by using the window-for-manager to transmit the printer driver 107b updated in Process 2. The processor 102a accepts the transmitting instruction input by the manager, and then transmits the updated printer driver 107b to the PC 11 via the communication interface 110, for example. The processor 102b of the PC 11 receives the updated printer driver 107b from the PC 10 via the communication interface 110, for example. A user inputs an install operation in the PC 11 to install the printer driver 107b. The processor 102b accepts the install operation input by the user, then installs the printer driver 107b received from the PC 10, and stores the printer driver 107b in the memory device 105. As a result, the PC 11 is capable of obtaining the information on the default print profile depending on the application information set by the manager. Accordingly, it is not necessary for a user of the PC 11 to set print profiles by himself.

<Process 4>

When the PC 11 in which the printer driver 107b is installed executes print process, the processor 102b checks (compares) the application information on the application program 106 being executed to generate printable data against the application information stored in the setting information file of the printer driver 107b. Where the application information matches the application information stored in the setting information file as a result of the check, the processor 102b obtains the information on the default print profile in association with the matching application information from the setting information file. The processor 102b generates a print job to which the default print profile is applied on the basis of the obtained information. Further, where the application information does not match with the application information stored in the setting information file as a result of the check, the processor 102b generates a print job to which a currently-set print profile (above-mentioned predetermined print profile) is applied, for example.

Specifically, where the PC 11 generates printable data and the image forming apparatus 20 prints the generated printable data, the user inputs a print instruction by using a predetermined application window displayed on the basis of the application program 106 for generating printable data. When the processor 102b accepts the print instruction input by the user, the processor 102b obtains the application information on the application program from the application program 106 being executed, for example. Since the processor 102b obtains the application information, the processor 102b is capable of determining the application program, which is used to generate the printable data of the print instruction input by the user, out of the application programs 106 stored in the memory device 105. Further, upon accepting the print instruction input by the user, the processor 102b executes the printer driver 107b to thereby determine if the obtained application information matches the application information stored in the setting information file. Where the obtained application information matches the application information stored in the setting information file, the processor 102b obtains the information on the default print profile in association with the matching application information. The processor 102b automatically applies the default print profile of the obtained information to the print job. Note that, the processor 102b may display the print instruction window including the default print profile on the display 15. In this case, the user is capable of confirming the default print profile displayed on the print instruction window. The processor 102b accepts a print start instruction via the print instruction window, and then applies the default print profile of the obtained information to the print job.

By executing the above-mentioned Process 1 to Process 4, it is possible to apply a default print profile set by a manager to a print job irrespective of intentions of a user. As a result, the printing cost may be reduced.

Further, according to the above-mentioned Process 1, it is possible to set whether the default print profile assigned based on application information is to be mandatorily applied or not. In other words, in the above-mentioned Process 1, a manager unchecks the setting area 34 of the default profile setting window 30, for example, to thereby set that to edit a print profile is not allowed. The processor 102a determines that to edit a print profile is not allowed on the basis of the setting of the setting area 34 set by the manager. Where the processor 102a determines that to edit a print profile is not allowed, the processor 102a mandatorily applies the default print profile to a print job. To mandatorily apply also means that, for example, to edit the default print profile displayed on the print instruction window by a user at will is prohibited. Further, to mandatorily apply means that, for example, the print instruction window may accept the default print profile displayed on the print instruction window edited by a user at will, but the processor 102b applies the default print profile to the print job irrespective of the print profile edited by the user when the processor 102b accepts the print start instruction. In other words, the PC 11 cannot apply a print profile, which is selected by a user at will, to a print job, which is to be printed by the image forming apparatus 20.

Meanwhile, according to the above-mentioned Process 1, a manager checks the setting area 34 of the default profile setting window 30, for example, and thereby to allow to edit the print profile is set. The processor 102a determines whether to edit the print profile is allowed on the basis of the setting of the setting area 34 input by the manager. Where the processor 102a determines that to edit the print profile is allowed, the processor 102a non-mandatorily applies the default print profile to the print job. In other words, the processor 102b not only accepts a print profile edited by a user at will by using the print instruction window, but also applies the print profile edited by the user to the print job.

Note that, where the printer driver 107b of the PC 10 updated in the above-mentioned Process 2 is installed in the PC 11 for a manager (PC for a user as a manager), the PC 11 for a manager can execute printing on the basis of the default print profile. Further, any of the plurality of PCs 10 and 11 may arbitrarily be used as a PC for a manager.

Figure 4:
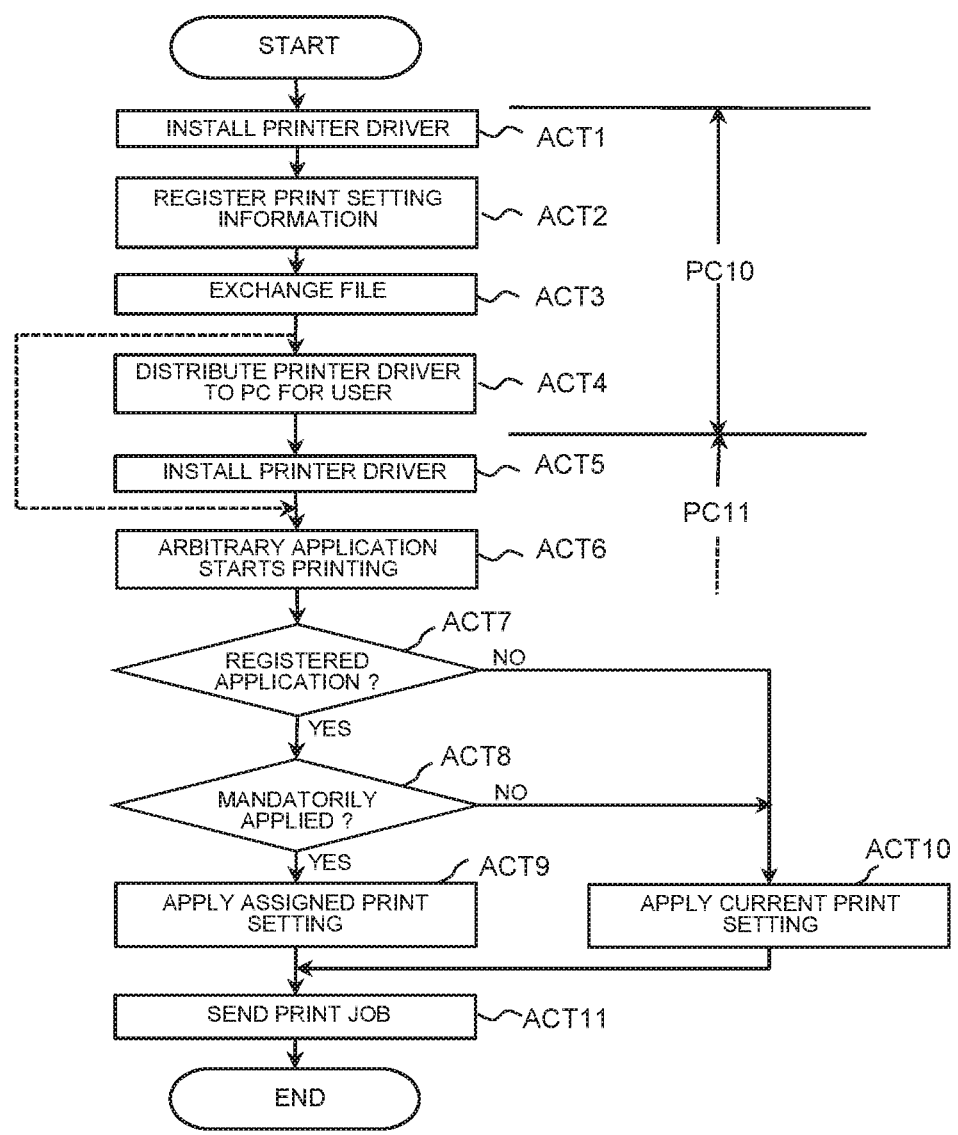
FIG. 4 is a flowchart illustrating the setting process and the print process of the printing system of the embodiment.

FIG. 4 is a flowchart illustrating the setting process and the print process of the above-mentioned Processes 1 to 4. Note that, in the following description, it is assumed that the printer driver 107a is pre-installed in the PC 10 and is stored in the memory device 105a of the PC 10. Further, it is assumed that the printer driver 107b before updating is also stored in the memory device 105a of the PC 10. Further, it is assumed that the processor 102a of the PC 10 recognizes that a manager logs in to the PC 10. In ACT1, the processor 102a of the PC 10 starts the printer driver 107 to execute the above-mentioned Process 1. For example, the processor 102a accepts a print profile setting instruction input by a manager by using the input devices 12 and the predetermined window-for-manager displayed on the display 15. The processor 102a starts the printer driver 107a on the basis of the setting instruction input by the manager.

In ACT2, the processor 102a generates, on the basis of the printer driver 107a, a default print profile to be applied to the PC 10 for a manager himself or the PC 11 for a user. In other words, firstly, the processor 102a displays, on the basis of the printer driver 107a started, the default profile setting window 30 of FIG. 3 on the display 15. The manager inputs application information (application name, application executable file name) in the first and second input areas 31 and 32 of the default profile setting window 30. Further, the manager inputs a default print profile, which is to be applied to a print job when executing printing by using the corresponding application program, in the third input area 33 of the default profile setting window 30. The processor 102a accepts the application information and the default print profile input by using the default profile setting window 30 of FIG. 3. The processor 102a stores the accepted application information and the information on the accepted default print profile in the setting information file of the printer driver 107a.

In ACT3, the processor 102a exports the setting information file, in which the information on the default print profile is stored in ACT2, from the printer driver 107a. The processor 102a exchanges the setting information file of the printer driver 107b with the exported setting information file. As a result, the setting information file of the printer driver 107b is overwritten and thereby updated. In ACT4, then, the processor 102a distributes the printer driver 107b updated in ACT3 to the PC 11 for a user. The default print profile setting process executed by the processor 102a of the PC 10 has been described above. Hereinafter, the print process executed by the processor 102b of the PC 11 will be described.

In ACT5, the processor 102b of the PC 11 for a user installs the distributed printer driver 107b in the PC 11 itself. Since the PC 11 is connected to the PC 10 via the network 100 such as a LAN (Local Area Network), the PC 11 is capable of installing the printer driver 107b distributed from the PC 10 in itself. Alternatively, the PC 11 may install the printer driver 107b in itself by connecting a USB memory, in which the printer driver 107b distributed from the PC 10 is stored, to the PC 11 for a user.

In ACT6, controlled by the processor 102, the PC 11 for a user sends a print job to the image forming apparatus 20 and thereby the image forming apparatus 20 starts printing. In other words, the processor 102b receives the print instruction input by a user by using an application window (for example, window for generating Word document) based on the application program 106 used for generating printable data. Upon receiving the print instruction, the processor 102b starts the printer driver 107b in order to start printing by the image forming apparatus 20.

In ACT7, the processor 102b checks the application information on the application program used to generate the printable data against the application information stored in the setting information file of the printer driver 107b (see ACT2). The processor 102b determines whether the application information matches the application information stored in the setting information file or not as a result of the check. Where the application information matches the application information stored in the setting information file (ACT7, YES), the process of the processor 102b proceeds to ACT8. In ACT8, the processor 102b determines whether to edit the default print profile is allowed or not on the basis of the setting of the setting area 34 of the default profile setting window 30. In other words, the processor 102 of the PC 11 determines whether the default print profile is to be mandatorily applied or not. Where to edit the default print profile is not allowed (is to be mandatorily applied) (ACT8, YES), the process of the processor 102b of the PC 11 proceeds to ACT9. In ACT9, the processor 102b of the PC 11 obtains the information on the default print profile stored in the setting information file of the printer driver 107b in association with the matching application information. The processor 102b displays the print instruction window including the default print profile of the obtained information on the display 15. The processor 102b accepts a print start instruction input by a user by using the print instruction window. The processor 102b accepts the print start instruction to thereby apply the default print profile as a print profile of a print job.

Further, where the application information on the application program used to generate the printable data does not match with the application information stored in the setting information file of the printer driver 107b in the above-mentioned ACT7 (ACT7, NO), the process of the processor 102b proceeds to ACT10. In ACT10, the processor 102b displays the print instruction window including the predetermined print profile, which is independent of the application program stored in the setting information file, on the display 15. The processor 102b accepts the current print profile (above-mentioned predetermined print profile) edited by the user by using the print instruction window. Further, the processor 102b accepts a print start instruction input by the user by using the print instruction window. The processor 102b accepts the print start instruction, and thereby applies the edited print profile as the print profile of the print job.

In ACT8, similarly, where to edit the default print profile is allowed (is not to be mandatorily applied) (ACT8, NO), the process of the processor 102b proceeds to ACT10. The processor 102b applies the edited print profile as the print profile of the print job. Note that, where to edit the default print profile is allowed (is not to be mandatorily applied) in ACT8, then in ACT10, as described above, the print instruction window including the predetermined print profile may be displayed on the display 15. Alternatively, similar to ACT9, the print instruction window including the default print profile of the obtained information may be displayed on the display 15.

In ACT11, the processor 102b then sends the print job to the image forming apparatus 20 via the communication interface 110, the print job including the information on the default print profile (see ACT9) or the information on the edited print profile (see ACT10) and the printable data. The image forming apparatus 20 receives the print job from the PC 11 via the communication interface 210, processes the print job, and forms an image corresponding to the printable data on a sheet.

Therefore the default print profile registered by the PC 10 is applied as the print profile of a print job when the PC 11 sends the print job. Accordingly, it is not necessary for a user to set print profiles by himself.

Further, the PC 10 for a manager may install the printer driver 107b, which is updated in the above-mentioned Process (see ACT3), in the PC 10 itself. Therefore the PC 10 is capable of instructing the image forming apparatus 20 to execute printing on the basis of the default print profile.

With reference to the flowchart of FIG. 4 again, a case, in which the PC 10 for a manager instructs the image forming apparatus 20 to execute printing on the basis of the default print profile of the printer driver 107a or the printer driver 107b updated by the PC 10, will be described. As shown by the dotted line of FIG. 4, the process of the processor 102a proceeds from ACT3 to ACT6.

In other words, after the process of ACT3, in ACT6, the processor 102a of the PC 10 sends the print job to the image forming apparatus 20, and thereby the image forming apparatus starts printing. In other words, the processor 102a receives the print instruction input by using the application window (for example, window for generating Word document) based on the application program 106, which is used to generate the printable data. Upon receiving the print instruction, the processor 102a starts the printer driver 107b (or the printer driver 107a) to instruct the image forming apparatus 20 to start printing.

In ACT7, the printer driver 107a of the PC 10 checks the application information on the application program used to generate the printable data against the application information stored in the setting information file of the printer driver 107b (see ACT2). The processor 102a determines whether the application information matches the application information stored in the setting information file or not as a result of the check. Where the application information matches the application information stored in the setting information file (ACT7, YES), the process of the processor 102a proceeds to ACT8. In ACT8, the processor 102a determines whether to edit the default print profile is allowed or not on the basis of the setting of the setting area 34 of the default profile setting window 30. In other words, the processor 102a of the PC 10 determines whether the default print profile is to be mandatorily applied or not. Where to edit the default print profile is not allowed (is to be mandatorily applied) (ACT8, YES), the process of the processor 102a of the PC 10 proceeds to ACT9. In ACT9, the processor 102a of the PC 10 obtains the information on the default print profile stored in the setting information file of the printer driver 107b in association with the matching application information. The processor 102a displays the print instruction window including the default print profile of the obtained information on the display 15. The processor 102a accepts a print start instruction input by a user by using the print instruction window. The processor (a manager as a user) 102a accepts the print start instruction to thereby apply the default print profile as a print profile of a print job.

Further, where the application information on the application program used to generate the printable data does not match with the application information stored in the setting information file in the above-mentioned ACT7 (ACT7, NO), the process of the processor 102a proceeds to ACT10. In ACT10, the processor 102a accepts the above-mentioned predetermined print profile edited by the user by using the print instruction window. Further, the processor 102a accepts a print start instruction input by the user by using the print instruction window. The processor 102a accepts the print start instruction, and thereby applies the edited print profile as the print profile of the print job. In ACT8, similarly, where to edit the default print profile is allowed (is not to be mandatorily applied) (ACT8, NO), the process of the processor 102a proceeds to ACT10. The processor 102b applies the edited print profile as the print profile of the print job.

In ACT11, the processor 102a then sends the print job to the image forming apparatus 20 via the communication interface 110, the print job including the information on the default print profile (see ACT9) or the information on the edited print profile (see ACT10) and the printable data. The image forming apparatus 20 receives the print job from the PC 11 via the communication interface 210, processes the print job, and forms an image corresponding to the printable data on a sheet.

Therefore the default print profile registered by the PC 10 is also applied as the print profile of the PC 10 for a manager. The PC 10 for a manager is capable of instructing the image forming apparatus 20 to execute printing on the basis of the default print profile. Therefore the PC 10 for a manager is capable of input the print start instruction on the basis of the low-cost default print profile assigned by the manager in the image forming apparatus 20.

As described above, according to the printing system of this embodiment, where a print job including printable data generated by a PC on the basis of an arbitrary application program is sent to an image forming apparatus to be printed by the image forming apparatus, a low-cost default print profile preset for each application program can be automatically applied to a print job as a print profile of the print job. As a result, according to the printing system of this embodiment, the printing cost may be reduced where the image forming apparatus executes a print job sent from the PC.

Further, in the present embodiment described above, it is assumed that the program that realizes the functions of the embodiment is prerecorded in the information processing apparatus (the PC 10). Alternatively, a program that realizes the similar functions may be downloaded in the information processing apparatus via a network. Further, a program that realizes the similar functions may be stored in a recording medium, and the program may be installed in the apparatus. The recording medium may be any type of recording medium (non-transitory computer readable recording medium) such as a CD-ROM that is capable of storing the program and is readable by the information processing apparatus. Further, in the present embodiment, the functions of the information processing apparatus may be realized on the basis of cooperation between the installed or downloaded program and the OS (operating/system) and the like of the information processing apparatus.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A printing system comprising:
   an information processing apparatus; and
   an image forming apparatus that is connected to the information processing apparatus via a network and executes a print job, wherein
   the information processing apparatus includes:
     a first communication interface,
     a memory device that stores a plurality of application programs and a printer driver program, the printer driver program including:
       a default print profile preset for each of one or more of the stored application programs,
       a default setting indicating whether or not the default print profile needs to be used for said each of one or more of the stored application programs, and
       a current print profile of a user of the information processing apparatus
     a first processor is configured to, when print data is generated by an application program,
       check whether or not a default print profile for the application program is stored in the memory device,
       if the default print profile is stored in the memory device and the default setting indicates that the default print profile needs to be used for the application program, control the first communication interface to transmit the print job including the default print profile and the generated print data to the image forming apparatus, and
       if the default print profile is not stored in the memory device or if the default print profile is stored and the default setting indicates that the default print profile does not need to be used for the application program, control the first communication interface to transmit the print job including the current print profile and the generated print data to the image forming apparatus, and
   the image forming apparatus includes:
     a second communication interface,
     a printer device that forms an image on a sheet, and
     a second processor that, upon receipt of the print job from the information processing apparatus via the second communication interface, controls the printer device to form an image on the sheet based on the print data and the default print profile or the current print profile included in the received print job.

2. The printing system according to claim 1, wherein each application program includes information indicating a name of the application program, and
the memory device stores the name of the application program and the default print profile in association with each other.

3. The printing system according to claim 1, wherein the first processor is configured to
   update the default print profile, and
   control the first communication interface to transmit the printer driver program including the updated default print profile to another information processing apparatus connected to the network.

4. The printing system according to claim 3, wherein the information processing apparatus further includes a display, and
the first processor is configured to
   start the printer driver program, and thereby generate a screen to be displayed on the display, indicating a default print profile setting window that is used to input a print profile for each application program, and
   stores in the memory device, the input print profile input via the default print profile setting window as the default print profile, in association with the application program.

5. The printing system according to claim 4, wherein the processor is configured to, when the default print profile is stored in the memory device and the default setting indicates that the default print profile needs to be used for the application program,
   generate a screen to be displayed on the display, indicating a print instruction window indicating the default print profile, and
   control the first communication interface to transmit, in response to a print start instruction input via the print instruction window, the print job including the default print profile and the generated print data to the image forming apparatus.

6. A printing method of a printing system including an information processing apparatus and an image forming apparatus that is connected to the information processing apparatus via a network and executes a print job, the printing method comprising:
    storing, in a memory device of the information processing apparatus, a plurality of application programs and a printer driver program, the printer driver program including
        a default print profile preset for each of one or more of the stored application programs,
        a default setting which indicates whether or not the default print profile needs to be used for said each of one or more of the stored application programs, and
        a current print profile of a user of the information processing apparatus;
    by the information processing apparatus, when print data is generated by an application program,
        checking whether or not a default print profile for the application program is stored in the memory device,
        if the default print profile is stored in the memory device and the default setting indicates that the default print profile needs to be used for the application program, transmitting a print job including the default print profile and the generated print data to the image forming apparatus via the network, and
        if the default print profile is not stored in the memory device or if the default print profile is stored and the default setting indicates that the default print profile does not need to be used for the application program, transmitting the print job including the current print profile and the generated print data to the image forming apparatus via the network; and
    by the image forming apparatus,
        receiving the print job from the information processing apparatus, and
        forming an image on the sheet based on the print data, and the default print profile or the current print profile included in the received print job.

7. The method according to claim 6, wherein
each application program includes information indicating a name of the application program, and
the memory device stores the name of the application program and the default print profile in association with each other.

8. The method according to claim 6, further comprising:
updating the default print profile, and
transmitting the printer driver program to another information processing apparatus connected to the network via the first communication interface, the printer driver program including the updated default print profile.

9. The method according to claim 8, wherein
the information processing apparatus further includes a display, and
the method further comprises
    starting the printer driver program, and thereby displaying on the display a default print profile setting window that is used to input a print profile for each application program, and
    storing in the memory device, the input print profile input via the default print profile setting window as the default print profile, in association with the application program.

10. The method according to claim 9, further comprising:
when the default print profile is stored in the memory device and the default setting indicates that the default print profile needs to be used for the application program,
    displaying a print instruction window indicating the default print profile, and
    transmitting, in response to a print start instruction input via the print instruction window, the print job to the image forming apparatus via the first communication interface, the print job including the default print profile and the generated print data.

\* \* \* \* \*